United States Patent Office 3,631,089
Patented Dec. 28, 1971

3,631,089
2-ACETYL OR AROYL XANTHIC ACID
PHENYL ESTERS
Earl Reeder, Nutley, and Leo Henryk Sternbach, Montclair, N.J., assignors to Hoffmann-La Roche Inc., Nutley, N.J.
No Drawing. Division of application Ser. No. 684,963, Nov. 22, 1967, which is a division of application Ser. No. 417,855, Dec. 14, 1964, now Patent No. 3,362,962, which in turn is a continuation-in-part of application Ser. No. 339,910, Jan. 24, 1964. This application Feb. 3, 1970, Ser. No. 8,396
Int. Cl. C07c 154/00
U.S. Cl. 260—455 B
10 Claims

ABSTRACT OF THE DISCLOSURE 2-acetyl or aroyl xanthic acid phenyl esters (A). (A) is prepared by reacting corresponding 2-aminophenyl ketone with nitrous acid; treating resulting product with salt of fluoroboric acid to obtain corresponding diazonium compound. Diazonium compound is converted to (A) with alkali or alkaline earth xanthate. (A) is convertible into 1,4-benzothiazepines, useful as muscle relaxants and anticonvulsants.

RELATED APPLICATIONS

This application is a division of Ser. No. 684,963 filed Nov. 22, 1967 and now abandoned, which is in turn a division of Ser. No. 417,855 filed Dec. 14, 1964 (now Pat. No. 3,362,962 issued Jan. 9, 1969), which in turn is a continuation-in-part of Ser. No. 339,910, filed Jan. 24, 1964 (now abandoned), all filed in the names of Earl Reeder and Leo Henryk Sternbach. The benefit of the filing dates of these earlier applications is hereby claimed.

BRIEF SUMMARY

This invention relates to novel compounds having a heterocyclic ring structure containing nitrogen and sulfur as the hetero atoms, to methods for producing such compounds, to novel derivatives of such compounds and to novel intermediates such as (A) above useful in the preparation of said heterocyclic ring compounds. More particularly, the invention relates to novel 1,4-benzothiazepines, to a method for producing such compounds, to novel derivatives of such 1,4-benzothiazepines and to novel intermediates useful in the preparation of 1,4-benzothiazepines.

DETAILED DESCRIPTION

The compounds of this invention can be represented by the following structural formulae

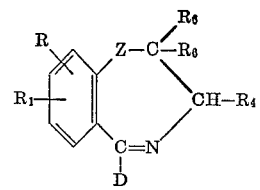

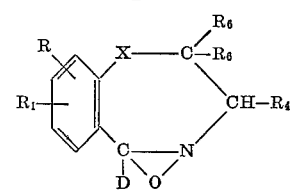

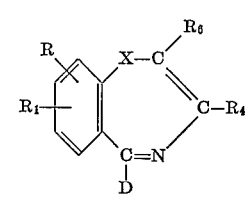

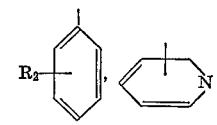

wherein D is selected from the group consisting of

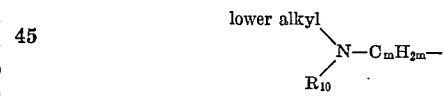

and lower alkyl, X is selected from the group consisting of sulfonyl; Z is selected from the group consisting of thio, sulfinyl and sulfonyl; R and $R_1$ are selected from the group consisting of hydrogen, halogen, nitro, lower alkyl, lower alkoxy, trifluoromethyl, lower alkyl thio, lower alkyl sulfinyl and lower alkyl sulfonyl; $R_2$ is selected from the group consisting of hydrogen, lower alkyl, halogen and trifluoromethyl; $R_4$ and $R_6$ are selected from the group consisting of hydrogen and lower alkyl; and $R_5$ is selected from the group consisting of hydrogen, $$\begin{array}{c}\text{lower alkyl}\\ \diagdown \\ \text{N}-\text{C}_m\text{H}_{2m}-\\ \diagup \\ R_{10}\end{array}$$

where $m$ is a whole integer from 2–7 and $R_{10}$ is selected from the group consisting of hydrogen and lower alkyl, lower acyl, lower alkenyl and lower alkynyl. Preferably, $R_1$ is positioned on the benzothiazepine nucleus at the 7-position and R is hydrogen. Still more preferably, $R_1$ is positioned on the benzothiazepine nucleus at the 7-position and R is hydrogen and if D includes a phenyl radical, $R_2$ is positioned on the phenyl radical at the 2'-position thereof.

The expression "lower alkyl," as utilized throughout the instant specification, is intended to connote both straight and branched chain hydrocarbon groups such as methyl, ethyl, propyl and isopropyl. The term "halogen," as used throughout the disclosure, is intended to connote all four halogens, namely, chlorine, bromine, iodine and fluorine. Preferred among the halogens for the purpose of the present invention are bromine and chlorine. "Lower alkyl thio," as used throughout the disclosure, represents a group such as methyl-thio and the like. The expressions "lower alkenyl" and "lower alkynyl" represent straight or branched chain monoethylenically unsaturated hydrocarbon groups and acetylenic hydrocarbon groups such as allyl and propargyl. The expression "lower alkoxy" connotes a group such as, preferably, methoxy and ethoxy

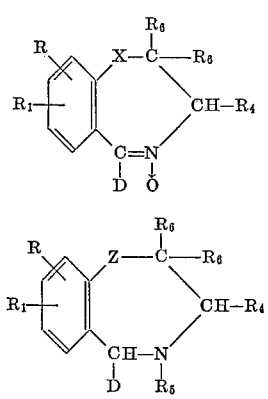

and the like. Each $R_6$ can represent the same or different groups. Preferably, they are the same and hydrogen. $R_4$ is similarly preferably hydrogen.

Compounds corresponding to Formulae I, Ia, Ib, Ic and Id above form acid addition salts with pharmaceutically acceptable inorganic or organic acids. Among the acids suitable for the salt-forming purpose are included such acids as mineral acids, e.g., hydrohalic acids such as hydrochloric acid, hydrobromic acid and the like, nitric acid, sulfonic acid, phosphorus acid, etc. and organic acids such as methane-sulfonic acid, succinic acid, citric acid, tartaric acid, maleic acid and the like.

One process aspect of the invention relates to the preparation of compounds corresponding to Formula Ib above wherein Z is thio, i.e., compounds having the formula

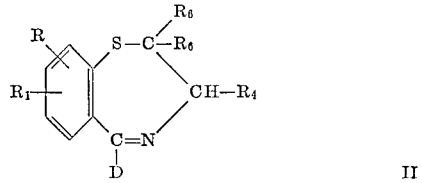

II wherein D, R, $R_1$, $R_4$ and $R_6$ are as above. Such a preparation involves initially reacting the corresponding 2-aminobenzene ketone with nitrous acid in the presence of an excess of a strong mineral acid, e.g., hydrochloric acid, sulfuric acid and the like. The resulting mixture may be treated with a salt of a fluoroboric acid such as an alkali metal salt, e.g., sodium fluoroborate. In this manner diazonium compounds are prepared having the formula

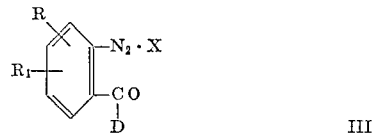

III wherein D, R and $R_1$ are as above and X is selected from the group consisting of an anion of a strong mineral acid and the radical $BF_4^-$.

In the formation of compounds of Formula III above, the nitrous acid may combine with the mineral acid present to form a compound such as nitrosylsulfate and the like and such compound may play a part in the formation of compounds of Formula III above.

The so-formed compounds of Formula III above are then reacted with a xanthate, i.e., a salt of xanthic acid such as an alkali metal xanthate, for example, sodium xanthate and potassium xanthate or an alkaline earth metal xanthate, whereby to provide a compound having the formula of

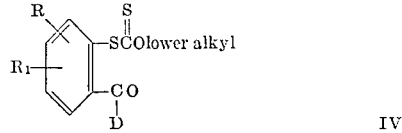

IV wherein R, $R_1$ and D are as above which can then be hydrolyzed, preferably under basic conditions, employing conventional hydrolysis techniques to compounds having the formula

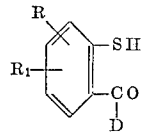

V wherein R, $R_1$ and D are as above.

Suitable xanthates have the formula

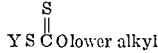

wherein Y is an alkaline earth metal or an alkali metal.

Compounds of Formula V can also be prepared from compounds of Formula III above by treating compounds of Formula III above with a metal thiocyanate, e.g., copper thiocyanate, to give a compound having the formula of

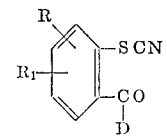

VI wherein R, $R_1$, and D are as above, and thereafter hydrolyzing, preferably under basic conditions, the resulting compound of Formula VI to compounds of the Formula V above utilizing conventional hydrolyzing techniques.

According to the present invention, compounds of Formula V are then reacted with or without isolation with a compound of the formula

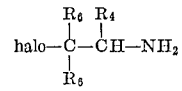

wherein $R_4$ and $R_6$ are as above and wherein preferably the halo atom is chlorine or bromine in the presence of a conventional inert solvent which may be water, an alcohol such as methanol and the like and a base such as sodium hydroxide whereby to yield a mixture containing a compound of the Formula II above and a compound having the formula

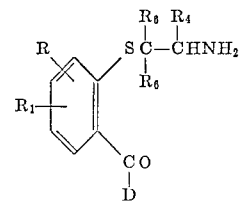

VII wherein D, R, $R_1$, $R_4$ and $R_6$ have the same meaning as ascribed thereto hereinabove.

Compounds of Formula VII can be further reacted with or without isolation from the reaction medium in which they are prepared to produce compounds having the Formula II above. For example, the reaction mixture containing the compounds of Formula II above and Formula VII above without isolating either can be heated in the presence of an inert organic solvent such as pyridine and the like whereby to effect cyclization of compounds corresponding to Formula VII above. Thus, the yield of compounds corresponding to Formula II above is increased.

Compounds of Formula VII above can also be prepared by reacting a compound of the formula

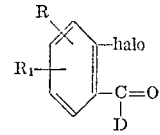

wherein R, $R_1$ and D are as above with a compound of the formula

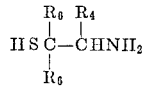

in the presence of a strong base, preferably an alkali metal hydroxide or an alkali metal alkylate or an alkali metal hydride, e.g., sodium hydride and an inert organic solvent such as pyridine. The so-formed compounds of Formula VII above can then be heated in the presence of an inert organic solvent such as pyridine and the like whereby ring closure to compounds of Formula II above occurs.

The so-cyclized compounds of Formula II above are then either (1) preferably treated with a peracid or hydrogen peroxide whereby to yield compounds of Formula Ic above or (2) treated with lithium aluminum hydride whereby to yield compounds of Formula Ia above wherein Z is thio and $R_5$ is hydrogen or (3) treated with preferably a periodate, e.g., sodium periodate or carefully treated with a calculated amount of other peracids whereby to yield a compound of the Formula Ib above wherein Z is sulfinyl.

In one procedure, a compound of Formula II above is treated with any convenient peracid such as peracetic acid or hydrogen peroxide at a temperature of 0°–150°, preferably 10°–60° in the presence of an acid such as acetic acid and the like whereby to prepare an epoxide of Formula Ic above, i.e., a compound of the formula

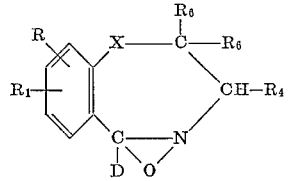

VIII wherein X, D, $R_1$, $R_4$ and $R_6$ have the same meanings as ascribed thereto hereinabove.

The resulting compound when heated in the presence of an inert organic solvent such as xylene, toluene and the like gives compounds of the Formula I above having the formula of

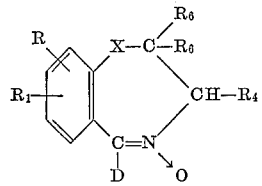

IX wherein X, D, R, $R_1$, $R_4$ and $R_6$ have the same meanings as above.

Compounds of Formula IX can be deoxygenated in the 4-position by treatment with a reducing agent such as phosphorus trichloride or by hydrogenating in the presence of Raney nickel. The resultant compound which has the Formula Ib above wherein Z is sulfonyl can be further reduced by hydrogenation in the presence of a conventional hydrogenation catalyst such as a noble metal, e.g., platinum oxide and the like or an alkali metal or an alkaline earth metal borohydride such as sodium borohydride whereby to provide compounds having the Formula Ia above wherein Z is sulfonyl, 2,3,4,5-tetrahydro-1,4-benzodiazepine 1,1-dioxides.

Compounds of Formula II above can also be treated with an oxidant such as a periodate, e.g., an alkali metal periodate, to provide the corresponding compound wherein Z is sulfinyl.

In yet another procedure, the product resulting from the performance of the final stage of the processes described in connection with the preparation of compounds of Formula II above (e.g., compounds corresponding to Formula II above) can be reduced with lithium aluminum hydride as is noted above or by catalytic hydrogenation in the presence of a noble metal such as platinum whereby to provide compounds having the formula

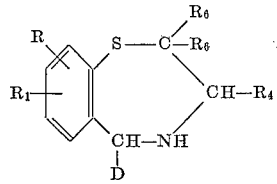

XI wherein D, R, $R_1$, $R_4$ and $R_6$ are as above.

Compounds of Formula XI can be further selectively treated with either a metal periodate to yield the corresponding compounds having a sulfinyl group in the 1-position or with a strong oxidizing agent, e.g., a peracid such as peracetic acid or trifluoroperacetic acid or hydrogen peroxide, to provide the corresponding compounds having a sulfonyl group in the 1-position.

The treatment with lithium aluminum hydride as described above, i.e., the formation of 2,3,4,5-tetrahydro-1,4-benzothiazepines, in every instance is effected at a temperature of −20 to +90°, preferably −5° to +40° C., in the presence of any conveniently available inert organic solvent such as tetrahydrofuran or an ether such as diethyl ether, dimethyl ether and the like. The treatment with an alkali metal periodate as described above, i.e., the formation of 1,4-benzothiazepine 1-oxides in every instance is effected preferably in the presence of an inert organic solvent such as an alcohol, e.g., methanol, ethanol and the like, a ketone such as acetone and methyl ethyl ketone, dioxane and the like at a temperature in the range of −10° to +60°, preferably −5° to +40°. Such treatment leads to compounds of the formulae set out above wherein Z is sulfinyl. The same effect may be achieved by the use of calculated amounts of a peracid such as peracetic acid or trifluoro peracetic acid.

In an alternate procedure for the preparation of compounds corresponding to Formula VII above (compounds which on heating in the presence of an inert organic solvent such as pyridine and the like cyclize to compounds of the formula II above), a compound corresponding to Formula V above, preferably, one wherein $R_1$ is nitro and R is hydrogen is reacted with a compound having the formula of

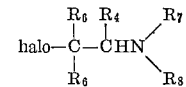

XII wherein $R_4$ and $R_6$ are as above and $R_7$ and $R_8$ are selected from the group consisting of, individually, acyl or hydrogen and taken together an acyl moiety of a dibasic acid, one of $R_7$ and $R_8$ being other than hydrogen. Thus, $R_7$ and $R_8$ can represent individually, lower acyl, e.g., propionyl, acetyl, or benzoyl and the like. Together they can represent a group such as phthaloyl, succinyl and the like.

Essentially, all that is required of the groups represented by $R_7$ and $R_8$, when other than hydrogen, is that they be readily hydrolyzable utilizing conventional techniques.

The resulting compound which has the formula

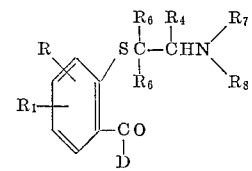

XIII wherein D, R, $R_1$, $R_4$, $R_6$, $R_7$ and $R_8$ are as above can be hydrolyzed to compounds having the Formula VII under acid conditions, for example.

Compounds of Formula XIII above wherein $R_1$ is nitro and R is hydrogen can by hydrogenated in the presence of any suitable reducing system such as one which includes iron to yield the corresponding compound wherein $R_1$ is amino. The resultant amino derivative thereafter, if desired, can be converted into the corresponding compound wherein $R_1$ is halogen by the treatment thereof with nitrous acid in the presence of a strong mineral acid, e.g., hydrochloric acid, followed by treatment of the resulting substance with a strong hydrohalic acid, e.g., hydrochloric acid, in the presence of a copper catalyst, e.g., cuprous chloride, cuprous bromide and the like. The resulting compound wherein $R_1$ is halogen is hydrolyzed employing acid hydrolysis techniques, e.g., in the presence of acetic acid and a hydrohalic acid, to yield a compound having the Formula VII above wherein $R_1$ is halogen. The last-mentioned compounds, as is noted above, can be cyclized employing the techniques recited hereinabove and exemplified hereinafter. Compounds of Formula VII are useful as appetite suppressant as well as intermediates in the preparation of compounds of Formula II above.

Compounds corresponding to Formula Ia wherein $R_5$ is lower alkyl, lower alkenyl and lower alkynyl can be synthesized from the corresponding compounds corresponding to Formula Ia above wherein $R_5$ is hydrogen by alkylating or alkenylating or alkynylating such compounds. The alkylation can proceed, for example, by forming the sodio derivative of compounds corresponding to Formula I above wherein $R_5$ is hydrogen with a sodium alkylate such as sodium methoxide in an inert organic solvent such as toluene and then reacting the sodio derivative with, for example, dialkyl sulfate or an alkyl halide in an inert solvent, for example, a hydrocarbon or dimethylformamide. Suitable dialkyl sulfates may be represented by dimethyl sulfate. Similarly, suitable alkyl halides may be represented by methyl iodide. Analogously, the alkenylation can be effected using an alkenyl halide, e.g., allyl bromide and the alkynylation can be effected using an alkynyl halide, e.g., propargyl bromide. Alternatively, the positioning of the alkyl or the alkenyl or the alkynyl group thusly can be effected under analogus reaction conditions without first forming the said sodio derivative.

Compounds of the Formula Ia above wherein $R_5$ is a lower

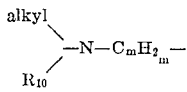

group can be synthesized from the corresponding compounds of Formula Ia above wherein $R_5$ is hydrogen by reacting the said last-mentioned compounds with a compound of the formula

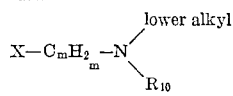

wherein $m$ is a whole integer from 2 to 7, $R_{10}$ is selected from the group consisting of hydrogen and lower alkyl and X is a halogen atom selected from the group consisting of chlorine, bromine and iodine.

The above reaction can be conducted in an inert solvent medium utilizing one or more inert organic solvents such as methanol, ethanol, chlorobenzene, benzene, dimethylformamide, toluene or the like. Temperature and pressure are not critical and the positioning of a basic side chain on compounds corresponding to Formula Ia above at $R_5$ thereof can be carried out at room temperature and atmospheric pressure and at elevated temperatures and/or elevated pressures.

Compounds of Formula Id above can be prepared by treating compounds of Formula I above wherein one of the $R_6$ groups is hydrogen with, for example, an anhydride of a lower alkanoic acid, e.g., acetic anhydride. Compounds of Formula Id above can be further carefully treated with lithium aluminum hydride to thereby prepare the corresponding compound of Formula Ib above wherein one of the $R_6$ groups is hydrogen.

Compounds of Formula Ib above wherein one of the $R_6$ groups is hydrogen can be treated with a halogenating agent, e.g., thionyl halide such as thionyl chloride or sulfuryl chloride to thereby provide the corresponding compound wherein Z is thio and which has halogen thereon in position-2. Accordingly, there are obtained compounds of the formula

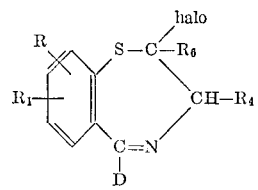

wherein R, $R_1$, $R_4$, $R_6$ and D are as above.

Compounds of Formula Ib above wherein Z is thio or sulfinyl can be treated with an acid, e.g., a hydrohalic acid, such as hydrochloric or hydrobromic acid and the like to obtain compounds of Formula VII above and compounds having the formula

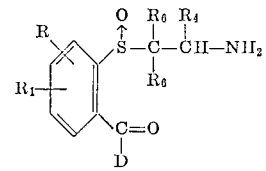

wherein R, $R_1$, $R_4$, $R_6$ and D are as above. The last-mentioned compounds are useful as anticonvulsants.

A preferred class of compounds included within the purview of the present invention are compounds of the formula

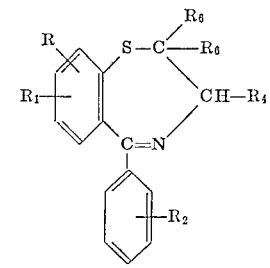

wherein R, $R_1$, $R_2$, $R_4$ and $R_6$ are as above. As is noted above, especially preferred are those compounds wherein R is hydrogen and $R_1$ is joined to the benzothiazepine nucleus at the 7-position thereof. Most advantageous are those compounds wherein R is hydrogen, $R_1$ is attached to the said nucleus at the 7-position thereof and $R_2$ is positioned on the 5-phenyl ring at the 2'-position thereof.

Another preferred class of compounds within the purview of the present invention are compounds of the formula

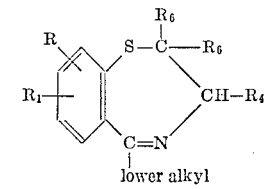

wherein R, $R_1$, $R_4$ and $R_6$ are as above.

Still another preferred class of compounds within the purview of the present invention are compounds of the formula

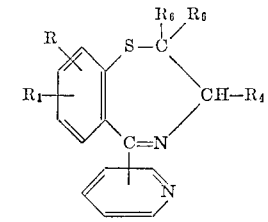

wherein R, $R_1$, $R_4$ and $R_6$ are as above.

In this aspect of the present invention, the 5-pyridyl moiety is preferably joined to the benzothiazepine nucleus at the 2-position of the 5-pyridyl ring.

The substituent designated $R_1$ in compounds of the formulae above can be obtained as other than hydrogen by treatment of the starting materials or by treatment of the end product 1,4-benzothiazepines. For example, the said end products wherein $R_1$ is nitro and R is hydrogen, can be obtained by treating the 1,4-benzothiazepine end products wherein R and $R_1$ are both hydrogen with nitric acid in the presence of sulfuric acid in the manner well known per se.

Compounds of Formulae XIV through XIX form medicinally acceptable acid addition salts with pharmaceutically acceptable acids including both inorganic and organic acids such as hydrochloric acid, hydrobromic acid, nitric acid, sulfuric acid, acetic acid, formic acid, succinic acid, maleic acid, p-toluene sulfonic acid, and the like.

Compounds corresponding to Formulas I, Ia, Ib, Ic, Id and, of course, Formulas XIV–XIX above are useful as muscle relaxants and anticonvulsants. They can be administered internally, for example parenterally or enterally in conventional pharmaceutical dosage forms with dosage adjusted to individual needs. For example, they can be administered in conventional liquid or solid vehicles to provide elixers, suspensions, tablets, capsules, powders and the like, according to acceptable pharmaceutical practices.

The following examples are illustrative but not limitative of the invention. All temperatures designated throughout the disclosure are in degrees centigrade, unless otherwise stated.

EXAMPLE 1

To 450 ml. of concentrated sulfuric acid, cooled to 10°, 76 g. (1 mole) of sodium nitrite was added slowly with stirring. The mixture was then heated to about 80° until a clear solution formed, after cooling to 30°, 232 g. (1 mole) of 2-amino-5-chlorobenzophenone was added in portions keeping the temperature between 30–40°. After stirring for 1 hour, the solution was poured slowly into 3 l. of ice wter. After filtration, a solution of 200 g. of sodium fluoroborate in 800 ml. of water was added. 2-benzoyl-4-chloro-benzenediazonium fluoroborate precipitated. The product was separated by filtration and washed with a small amount of water.

EXAMPLE 2

The fluoroborate of Example 1 was added within 5 minutes to a vigorously stirred solution of 240 g. (1.5 mole) of potassium ethyl xanthate in 1.5 l. of water heated to 75°. After the addition was completed, the mixture was stirred for 15 minutes, cooled and extracted with ether. The ether extract was dried over sodium sulfate, filtered and the filtrate concentrated in vacuo to dryness yielding the ethyl xanthic acid 2-benzoyl-4-chlorophenyl ester as the residue.

EXAMPLE 3

The residue of Example 2 was added to a solution of 240 g. of potassium hydroxide in a mixture of 600 ml. of water and 600 ml. of ethanol. The reaction mixture was stirred and refluxed for 15 minutes, while 35 g. of zinc dust was carefully introduced. One liter of water was then added and the mixture filtered over a filter aid, and washed with 500 ml. of water. The filtrate containing the thiophenol, 5 - chloro - 2 - mercapto benzophenone, was cooled to room temperature and a solution of 204 g. of bromoethylamine hydrobromide in 350 ml. of water was added. After stirring for 15 minutes, the reaction mixture was extracted with methylene chloride and the organic layer dried over sodium sulfate and filtered. The filtrate was acidified with methanolic hydrochloric acid and concentrated in vacuo. To the residue consisting of 7-chloro-2,3-dihydro-5-phenyl-1,4-benzothiazepine and 5-chloro-2-(2-aminoethylthio)benzophenone, 1 liter of pyridine was added. The solution was refluxed for 1 hour, then concentrated in vacuo and the residue dissolved in a mixture of methylene chloride and water. The organic layer was separated, dried, filtered and the filtrate acidified with ethanolic hydrochloric acid and diluted with about 300 ml. of ethanol. The solution was concentrated in vacuo to remove methylene chloride. 7-chloro-2,3-dihydro-5-phenyl-1,4-benzothiazepine hydrochloride melting at about 230°, was separated by filtration and washed with a small amount of ethanol. Recrystallization from a mixture of ethanol and ether gave yellow prisms of the product melting at 233–234° (dec.).

EXAMPLE 4

A solution of 125 g. of copper sulfate in 500 ml. of water (90°) was combined with a solution of 95 g. of sodium thiocyanate in 250 ml. of water. The precipitated copper thiocyanate was separated by filtration, washed with water and was suspended in 500 ml. of water. To this mixture was added 50 g. of sodium thiocyanate and 2-benzoyl-4-chloro-benzenediazonium fluoroborate prepared from ½ mole of the aminobenzophenone as in Example 1. The mixture was stirred for 24 hours at room temperature. The solids containing the reaction product were separated by filtration, washed with cold water and extracted with boiling alcohol (about 1 liter). The hot alcohol solution was filtered to remove the copper thiocyanate. On cooling, 5-chloro-2-thiocyanobenzophenone crystallized from the alcohol solution. The product was purified by recrystallization from ethanol and formed cream-colored needles melting at 98–99°.

EXAMPLE 5

A mixture of 78 g. of 5-chloro-2-thiocyanobenzophenone in 800 ml. of alcohol, 200 ml. of 40 percent sodium hydroxide and 60 g. of sodium hydrosulfite was refluxed for ½ hour. 2-mercapto-5-chlorobenzophenone formed and was then alkylated with bromoethylamine hydrobromide as described in Example 3. Further treatment with pyridine as described in Example 3 gave 7-chloro-2,3-dihydro-5-phenyl-1,4-benzothiazepine hydrochloride which, after recrystallization, was found to have a melting point of 233–234° (dec.).

The free base was liberated from the above hydrochloride with sodium hydroxide and extracted with ether. The ether solution was concentrated in vacuo and 7-chloro-2,3 - dihydro - 5 - phenyl - 1,4 - benzothiazepine crystallized from ether as colorless prisms melting at 79–80°.

EXAMPLE 6

A solution of 34 g. (0.125 mole) of 7-chloro-2,3-dihydro-5-phenyl-1,4-benzothiazepine hydrochloride in 200 ml. of dry tetrahydrofuran was carefully added at room temperature to a stirred suspension of 10 g. (0.25 mole) of lithium aluminum hydride in 600 ml. of tetrahydrofuran. The reaction mixture was refluxed for 2 hours then cooled in an ice-bath. One liter of wet ether was added slowly and the mixture filtered through a hyflo bed. The filtrate was dried, concentrated in vacuo to dryness and the residue dissolved in ethanol. The solution was acidified with an excess of methanolic hydrogen chloride. On addition of ether, 7-chloro-5-phenyl-2,3,4,5-tetrahydro-1,4-benzothiazepine hydrochloride was obtained.

Recrystallization of the product from a mixture of ethanol and ether gave slightly yellow needles melting at 267–268°.

EXAMPLE 7

To a stirred solution of 5.4 g. (0.02 mole) of 7-chloro-2,3-dihydro-5-phenyl-1,4-benzothiazepine hydrochloride in 200 ml. of methanol cooled in an ice-bath, 4.5 g. (0.021 mole) of sodium meta-periodate dissolved in 42 ml. of water was added. The reaction mixture was stirred for 6 hours with ice cooling and 14 hours at room temperature. The precipitated sodium iodate was separated by filtration and the filtrate concentrated in vacuo to a small volume. The concentrate was extracted with methylene chloride and the organic layer was separated, dried and concentrated in vacuo to dryness. The residue thus obtained was dissolved in methanol and acidified with methanolic hydrogen chloride. Addition of ether gave 7-chloro - 2,3-dihydro-5-phenyl-1,4-benzothiazepine 1-oxide hydrochloride. Recrystallization of the product from a mixture of methanol and ether gave slightly yellow prisms melting at 206–207°.

EXAMPLE 8

To a stirred solution of 4 g. (0.014 mole) of 7-chloro-5-phenyl - 2,3,4,5 - tetrahydro-1,4-benzothiazepine hydrochloride in 100 ml. of methanol cooled in an ice bath, 3.2 g. (0.015 mole) of sodium meta-periodate dissolved in 28 ml. of water was added. The reaction mixture was stirred for 5 hours with ice cooling and 23 hours at room temperature. The precipitated sodium iodate was separated by filtration and the filtrate concentrated in vacuo to a small volume. The concentrate was extracted with methylene chloride and the organic layer was separated, dried and concentrated in vacuo to dryness. A methanol solution of the residue was acidified with methanolic hydrogen chloride. On addition of ether 7-chloro-2,3,4,5-tetrahydro-5-phenyl - 1,4 - benzothiazepine 1-oxide hydrochloride crystallized. Recrystallization from a mixture of methanol and ether gave colorless prisms of the product melting at 230–231°.

The base was liberated from the hydrochloride with alkali and crystallized from ether as colorless prisms melting at 116–117°.

EXAMPLE 9

A solution of 43.2 g. (0.158 mole) of 7-chloro-2,3-dihydro-5-phenyl-1,4-benzothiazepine hydrochloride in 400 ml. of acetic acid and 70 ml. of 30 percent hydrogen peroxide was left at room temperature exposed to daylight for 14 days. 7-chloro-4,5-epoxy-2,3,4,5-tetrahydro-5-phenyl-1,4-benzothiazepine 1,1-dioxide precipitated and was separated by filtration. On recrystallization from methylene chloride, colorless prisms of the product were obtained which, when introduced into a melting point apparatus at 200°, melted at 205° then resolidified and remelted at 265–266°.

EXAMPLE 10

A mixture of 5 g. of 7-chloro-4,5-epoxy-2,3,4,5-tetrahydro-5-phenyl-1,4-benzothiazepine 1,1-dioxide in 100 ml. of boiling xylene was refluxed for 10 minutes and then cooled. 7-chloro-2,3-dihydro-5-phenyl-1,4-benzothiazepine 1,1,4-trioxide formed and was separated by filtration. The product was crystallized from methylene chloride as colorless needles melting at 265–266°.

EXAMPLE 11

To a stirred suspension of 7.3 g. (0.022 mole) of 7-chloro - 2,3-dihydro-5-phenyl-1,4-benzothiazepine - 1,1,4-trioxide in 300 ml. of chloroform, 9 ml. (0.1 mole) of phosphorus trichloride was added. The reaction mixture was refluxed for 1 hour then cooled and iced and an excess of 50 percent potassium hydroxide added. The mixture was stirred at room temperature until complete solution was achieved. The organic layer was separated, dried and concentrated in vacuo to dryness. The residue crystallized from acetone and yielded 7-chloro-2,3-dihydro-5-phenyl-1,4-benzothiazepine 1,1-dioxide. Recrystallization from acetone gave colorless prisms of the product melting at 164–165°.

EXAMPLE 12

A solution of 21.3 g. (0.07 mole) of 7-chloro-2,3-dihydro-5-phenyl-1,4-benzothiazepine 1,1-dioxide in 200 ml. of acetic acid and 20 ml. of water was hydrogenated at room temperature and atmospheric pressure in the presence of 1.8 g. of platinum oxide. After the absorption of 1.2 liter of hydrogen (21 hours) the catalyst was separated by filtration and the filtrate concentrated in vacuo to dryness. The residue was dissolved in methylene chloride, washed with dilute alkali and the organic layer dried and concentrated to a smaller volume. The concentrate (ca. 50 ml.) was adsorbed on a column prepared with 200 g. of Woelm grade I alumina. On elution of the column with methylene chloride, the first 250 ml. of eluate (after concentration to dryness in vacuo), gave a residue which crystallized from ether to yield 7-chloro-2,3,4,5-tetrahydro-5-phenyl-1,4-benzothiazepine 1,1 - dioxide. Recrystallization from ether gave colorless plates of the product melting at 159–160.5°.

EXAMPLE 13

A stirred suspension of 19.2 g. (0.06 mole) of 7-chloro - 2,3 - dihydro-5-phenyl-1,4-benzothiazepine-1,1,4-trioxide in 200 ml. of acetic anhydride was refluxed for 5 hours. After concentration of the reaction mixture in vacuo to dryness, the residue was crystallized from benzene yielding 7-chloro-5-phenyl-1,4-benzothiazepine 1,1-dioxide. The product was recrystallized from a mixture of methylene chloride and ether as yellow prisms having a melting point of 207–208°.

EXAMPLE 14

To a suspension of 0.8 g. (0.021 mole) of lithium aluminum hydride in 90 ml. of dry tetrahydrofuran, 1.5 g. (0.005 mole) of 7-chloro-5-phenyl-1,4-benzothiazepine 1,1-dioxide was added. The reaction mixture was stirred at room temperature for 30 minutes then cooled in an ice-bath and the excess of lithium aluminum hydride was destroyed by the gradual addition of wet ether. The reaction mixture was filtered through hyflo and the filtrate was dried and concentrated in vacuo to dryness. The residue was dissolved in ethanolic hydrogen chloride and the hydrochloride precipitated by the addition of acetone. The crude salt was separated and converted into 7-chloro-2,3-dihydro - 5 - phenyl - 1,4 - benzothiazepine 1,1-dioxide by treatment with alkali and crystallization from acetone. Recrystallization from acetone gave colorless prisms of the product melting at 164–165°.

EXAMPLE 15

A solution of 5.8 g. (0.02 mole) of 7-chloro-2,3-dihydro - 5 - phenyl - 1,4 - benzothiazepine 1-oxide hydrochloride in 60 ml. of 3 N hydrochloric acid was heated for 4 hours on a steam bath. The reaction mixture was concentrated in vacuo to dryness. Crystallization of the residue from a mixture of ethanol and isopropanol yielded 5 - chloro - 2 - (2 - aminoethylsulfinyl)benzophenone melting about 150°. Light yellow needles of the product melting at 152–153° crystallized from a mixture of methanol and ether.

The above hydrochloride was converted to the ring closed starting material in boiling pyridine.

EXAMPLE 16

To 65 ml. of thionyl chloride, 18.5 g. (0.065 mole) of 7 - chloro - 2,3 - dihydro - 5 - phenyl - 1,4-benzothiazepine 1-oxide hydrochloride was carefully added. When the reaction had subsided, the reaction mixture was poured onto ice, made alkaline with 50 percent potassium hydroxide and extracted with methylene chloride. The organic layer was separated, dried and concentrated in vacuo to dryness. The residue was crystallized from a mixture of ether and petroleum ether yielding 2,7-dichloro - 2,3 - dihydro - 5 - phenyl-1,4-benzothiazepine. Recrystallization from ether yielded colorless prisms of the product melting at 133–134°.

EXAMPLE 17

To a stirred solution of 6.8 g. (0.06 mole) of 2-mercaptoethylamine hydrochloride in 150 ml. of dimethylformamide, 6.6 g. (0.122 mole) of sodium methoxide was added. The mixture was heated at 40–50° for 15 minutes, 15.6 g. (0.06 mole) of 2-chloro-5-nitrobenzophenone was then added and stirring was continued for 3 hours at room temperature. Dilute sodium hydroxide was added and the product was extracted with methylene chloride. The organic layer was separated, dried and concentrated in vacuo to a small volume. 5-nitro-2-(aminoethylthio)benzophenone crystallized and was separated by filtration. Recrystallization from methylene chloride gave the product as yellow needles melting at 189–190°.

EXAMPLE 18

A mixture of 10.4 g. (0.04 g. mole) of 2-mercapto-5-nitrobenzophenone, 800 ml. of methanol, 2.2 g. (0.04 mole) of sodium methoxide and 10 g. (0.04 mole) of β-bromoethylphthalimide was refluxed for 17 hours and then concentrated in vacuo to dryness. The residue was extracted with methylene chloride and washed with dilute sodium hydroxide. The organic layer was dried and concentrated in vacuo to a smaller volume. The concentrate was diluted with petroleum ether. N-[2-(2-benzoyl-4-nitrophenylthio)ethyl]phthalimide precipitated and was found to have a melting point at 120–123°. Recrystallization from a mixture of methylene chloride and petroleum ether gave yellow prisms of the product melting at 126–127°.

EXAMPLE 19

To a stirred suspension of 10 g. (0.023 mole) of N-[2-(2 - benzoyl - 4 - nitrophenylthio)ethyl]phthalimide in a mixture of 100 ml. of acetic acid and 100 ml. of water heated on a steam bath, 7.5 g. of iron filings (40 mesh) was added carefully over a period of 45 minutes. The reaction mixture was heated an additional 30 minutes, then filtered through hyflo. The fitrate was diluted with water and extracted with methylene chloride. The organic layer was washed with cold dilute potassium hydroxide, dried and concentrated in vacuo to dryness. Crystallization of the residue from a mixture of ethanol, ether and petroleum ether yielded N-[2-(4-amino-2-benzoylphenylthio)ethyl] phthalimide melting at 107–113°. Light yellow prisms of the product melting at 115–116° were obtained on crystallization from ethanol.

EXAMPLE 20

To a cooled suspension of 4 g. (0.01 mole) of N-[2-(4 - amino - 2 - benzoylphenylthio)ethyl]phthalimide in 60 ml. of 3 N hydrochloric acid, 11 ml. of 1 N sodium nitrite was added within 10 minutes at 0–5°. The reaction mixture was stirred at 0–5° for 45 minutes and then added to a solution of 2 g. (0.02 mole) of cuprous chloride in 40 ml. of concentrated hydrochloric acid at room temperature. The reaction mixture was stirred for 2 hours at room temperature then poured onto ice, made alkaline with an excess of ammonium hydroxide and extracted with methylene chloride. The methylene chloride layer was dried, concentrated in vacuo to a volume of about 50 ml. and then filtered through 30 g. of Woelm grade I alumina. The filter bed was washed with methylene chloride and the filtrate collected in fractions. The first 50 ml. of filtrate was concentrated in vacuo to dryness and the residue crystallized from ether to give N-[2-(2-benzoyl-4-chlorophenylthio)ethyl]phthalimide. Colorless prisms of the product melting at 106–107° were obtained on recrystallization from ether.

EXAMPLE 21

A solution of 0.8 g. (0.002 mole) of N-[2-(2-benzoyl-4-chlorophenylthio)ethyl]phthalimide in a mixture of 35 ml. of acetic acid and concentrated hydrochloric acid was refluxed for 17 hours. The reaction mixture was poured onto ice, made alkaline with 50 percent potassium hydroxide and extracted with methylene chloride. The organic layer was separated, dried, acidified with hydrogen chloride and concentrated in vacuo to dryness. The residue crystallized from a mixture of ethanol and ether to give 5-chloro-2-(2-aminoethylthio)benzophenone hydrochloride. Recrystallization from a mixture of ethanol and ether gave the product as pale yellow needles melting at 168–169°. Similarly, N-[2-(2-benzoyl-4-nitrophenylthio)-ethyl]phthalimide can be converted to 5-nito-2-(aminoethylthio)-benzophenone.

EXAMPLE 22

A solution of 1.9 g. (0.061 mole) of 7-chloro-2,3-dihydro-5-phenyl-1,4-benzothiazepine hydrochloride in 20 ml. of 3 N hydrochloric acid was heated on the steam bath for 1 hour. The turbid reaction mixture was poured into ice water, made alkaline and extracted with methylene chloride. The organic layer was dried and concentrated in vacuo to dryness and the residue thus obtained dissolved in methanol and acidified with methanolic hydrogen chloride. On addition of ether 5-chloro-2-(2-aminoethylthio) benzophenone hydrochloride crystallized and was found to have a melting point of 160–161°. Recrystallization of the product from a mixture of ethanol and ether gave the product as pale yellow needles melting at 168–169°.

EXAMPLE 23

To 450 ml. of concentrated sulfuric acid, cooled to 10°, 69 g. (1 mole) of sodium nitrite was added slowly with stirring. The mixture was then heated to about 80° until a clear solution formed. After cooling to 30°, 197 g. (1 mole) of 2-aminobenzophenone was added in portions keeping the temperature between 30–40°. After stirring for 1 hr., the solution was poured slowly into 3 liters of ice-water. After filtration, a solution of 200 g. of sodium fluoroborate in 800 ml. of water was slowly added to the filtrate with stirring. 2-benzoyl-benzenediazonium fluoroborate precipitated and was separated by filtration. The precipitate was washed with a small amount of water. The so-washed precipitate was added over a period of 10 minutes to a vigorously stirred solution of 240 g. (1.5 mole) of recrystallized potassium ethyl xanthate [1] in 1.5 liter of water heated to 75°. After the addition was completed, the mixture was stirred for 5 min., cooled and extracted with ether. The ether extract was dried over sodium sulfate, filtered, and the filtrate concentrated in vacuo to dryness yielding a crude containing ethyl xanthic acid 2-benzoylphenyl ester. A solution of 240 g. of potassium hydroxide in a mixture of 600 ml. of water and 600 ml. of ethanol was added to the crude. The reaction mixture was then stirred and refluxed for 15 min., while 35 g. of zinc dust was carefully introduced. One liter of water was then added, and the mixture was filtered over a filter aid, and washed with 500 ml. of water. The filtrate containing 2-mercapto benzophenone was cooled to room temperature, and a solution of 204 g. of bromoethylamine hydobromide in 350 ml. of water was added. After stirring for 15 min., the reaction mixture was extracted with methylene chloride and the organic layer dried over sodium sulfate and filtered. The filtrate was acidified with methanolic hydrochloric acid and concentrated in vacuo. To the residue which contained 2-(2-aminoethylthio)benzophenone and 2,3-dihydro-5-phenyl-1,4-benzothiazepine there was added one liter of pyridine. The solution was refluxed for 1 hr., then concentrated in vacuo and the residue dissolved in a mixture of methylene chloride and water. The organic layer was separated, dried, and concentrated in vacuo to dryness. The oily residue was dissolved in ether and filtered over 500 g. of Woelm grade I alumina. The filter bed was then washed with ether. The filtrate was concentrated in vacuo to dryness and the residue was crystallized from a mixture of ether and petroleum ether. The crude product was purified by recrystallization from the same solvent mixture and gave 2,3-dihydro-5-phenyl-1,4-benzothiazepine as colorless prisms melting at 64–65°.

A solution of 7 g. of 2,3-dihydro-5-phenyl-1,4-benzothiazepine in an excess of methanolic hydrogen chloride was concentrated in vacuo to dryness. The residue was crystallized twice from a mixture of methylene chloride and ether, and formed yellow prisms of 2,3-dihydro-5-phenyl-1,4-benzothiazepine hydrochloride melting at 201–202°.

EXAMPLE 24

A solution of 250 g. of copper sulfate in 1 liter of hot water was combined with a solution of 223 g. of potassium thiocyanate in 500 ml. of water. The precipitated copper thiocyanate was separated by filtration, washed with water and suspended in 1 liter of water. To this mixture was added 100 g. of potassium thiocyanate and ---
[1] Technical grade ethyl xanthate was recrystallized from a five-fold amount of boiling ethanol.

crude 2-benzoyl-benzenediazonium fluoroborate prepared from 1 mole of aminobenzophenone as in Example 23. The mixture was stirred overnight. A precipitate which formed was separated by filtration. The precipitate was washed with cold water and extracted with about 1 liter of boiling ether. The ether layer was dried and filtered. To this solution (ca. 1 liter), about 2 liters of petroleum ether was added. The mixture was cooled, the supernant solution decanted and the residual insoluble oil discarded. The decanted solution deposited crystals which were filtered off (M.P. 80–91°). The so-filtered solution was concentrated and the residual oil recrystallized from ethanol to give crystals, M.P. 73–78°. The crystals of M.P. 80–91° and of M.P. 73–78° were combined. After crystallization of the combination from an ether and petroleum ether mixture and then from dilute alcohol, slightly yellow crystals of 2-thiocyano benzophenone were obtained, melting at 82–82.5°.

EXAMPLE 25

A solution of 5.5 g. (0.02 mole) of 2,3-dihydro-5-phenyl-1,4-benzothiazepine in 60 ml. of 3 N hydrochloric acid was refluxed for 21 hours. The reaction mixture was concentrated in vacuo to dryness and the residue crystallized from a mixture of isopropanol and ether. The crude product was purified by crystallization from the same solvent mixture and formed colorless prisms of 2-(2-aminoethyl-thio)benzophenone hydrochloride melting at 152–153°.

EXAMPLE 26

To a refluxing, stirred solution of 4.7 g. (0.02 mole) of 2,3 - dihydro - 5 - phenyl - 1,4 - benzothiazepine in 100 ml. of methylene chloride was added over a period of 20 minutes, a solution of 1.6 ml. (0.021 mole) of sulfuryl chloride in 25 ml. of methylene chloride. The reaction mixture was refluxed for 1 hr. and the formed crystalline precipitate was separated by filtration. The crystals were dissolved in a mixture of methylene chloride and ice cold dilute potassium hydroxide. The organic layer was separated, dried, and concentrated in vacuo to dryness. The residue was crystallized from a mixture of ether and petroleum ether to give prisms. Recrystallization from the same solvent mixture gave colorless prisms of 2 - chloro - 2,3 - dihydro - 5 - phenyl-1,4-benzothiazepine melting at 93–94°.

EXAMPLE 27

To a stirred solution of 4.7 g. (0.02 mole) of 2,3-dihydro - 5 - phenyl - 1,4 - benzothiazepine in 100 ml. of methanol cooled in an ice bath, 4.2 g. (0.02 mole) of sodium meta-periodate dissolved in 40 ml. of water was added. The reaction mixture was stirred for 1 hour at 30° and 4 hours at room temperature. The resultant mixture was filtered. The filtrate was concentrated in vacuo to a small volume. The concentrate was extracted with methylene chloride and the organic layer was separated, dried and concentrated in vacuo to dryness. The residue thus obtained was dissolved in ether and yielded crystalline 2,3 - dihydro - 5 - phenyl - 1,4 - benzothiazepine 1-oxide. Recrystallization of the product from ether gave colorless prisms melting at 158–160°.

EXAMPLE 28

A solution of 12 g. (0.05 mole) of 2,3 - dihydro - 5-phenyl - 1,4 - benzothiazepine in a mixture of 130 ml. of acetic acid and 20 ml. of 30% hydrogen peroxide was left at room temperature, exposed to daylight, for 17 days. The reaction mixture was diluted with water and 4,5 - epoxy - 2,3,4,5 - tetrahydro - 5 - phenyl-1,4-benzothiazepine 1,1-dioxide which precipitated was separated by filtration. The product was purified by crystallization from a mixture of methylene chloride and ether and formed colorless prisms melting at 169–170°.

EXAMPLE 29

A solution of 2 g. of 4,5 - epoxy - 2,3,4,5 - tetrahydro-5 - phenyl - 1,4 - benzothiazepine 1,1 - dioxide in 60 ml. of xylene was refluxed for ½ hr. and then cooled. The crystalline reaction product was separated by filtration. Recrystallization from a mixture of methylene chloride and ether gave colorless needless of 2,3 - dihydro-5-phenyl - 1,4 - benzothiazepine 1,1,4 - trioxide melting at 238–9°.

EXAMPLE 30

A solution of 23.9 g. (0.1 mole) of 2,3 - dihydro - 5-phenyl - 1,4 - benzothiazepine in 200 ml. of dry tetrahydrofuran was added slowly at room temperature to a stirred suspension of 8 g. (0.2 mole) of lithium aluminum hydride in 600 ml. of tetrahydrofuran. The reaction mixture was reflux for 2 hr. and then cooled in an ice bath. One liter of wet ether was added slowly and the mixture filtered through a hyflo-bed. The filtrate was dried, concentrated in vacuo to dryness and the residue dissolved in ether. On standing, crystalline 2,3,4,5 - tetrahydro-5-phenyl - 1,4 - benzothiazepine was obtained. Recrystallization from ether gave colorless needles of the product melting at 89–90°.

EXAMPLE 31

To a stirred solution of 4.8 g. (0.020 mole) of 2,3,4,5-tetrahydro-5-phenyl-1,4-benzothiazepine in 100 ml. of methanol cooled in an ice bath, 4.2 g. (0.020 mole) of sodium meta-periodate dissolved in 40 ml. of water was added. The reaction mixture was stirred for 4 hrs. at room temperature. The resultant mixture was filtered and the filtrate concentrated in vacuo to a small volume. The concentrate was extracted with methylene chloride and the organic layer was separated, dried and concentrated in vacuo to dryness. On addition of ether, crude 2,3,4,5-tetrahydro-5-phenyl - 1,4 - benzothiazepine 1-oxide crystallized. Recrystallization from a mixture of $CH_2Cl_2$ and ether gave colorless needles of the product melting at 147–148°.

EXAMPLE 32

To a stirred solution of 9.5 g. (0.04 mole) of 2,3,4,5-tetrahydro-5-phenyl-1,4-benzothiazepine in 50 ml. of chlorobenzene, there was added a solution of 12.2 g. (0.1 mole) of diethylaminoethyl chloride [2] in 75 ml. of chlorobenzene. The mixture was refluxed for 18 hrs. and then cooled. Crude 4-(2-diethylaminoethyl)-2,3,4,5-tetrahydro-5-phenyl-1,4-benzothiazepine hydrochloride crystallized out. Recrystallization from a mixture of methylene chloride and ether gave the product as colorless needles melting at 193–194°.

A solution of 1 g. of 4-(diethylaminoethyl)-2,3,4,5-tetrahydro-5-phenyl-1,4-benzothiazepine hydrochloride in water was filtered by gravity, made basic with NaOH, and extracted with ether. The ether extract was dried over sodium sulfate and concentrated in vacuo to yield an almost colorless oil of 4-(2-diethylaminoethyl)-2,3,4,5-tetrahydro-5-phenyl-1,4-benzothiazepine. The NMR spectrum was consistent with the structure of the compound and showed the protons of the two equivalent ethyl groups (attached to nitrogen) at 7.50τ and 9.02τ, the protons of three additional methylene groups (adjacent to nitrogens) at 7.10–7.50τ, the protons of the methylene group attached to sulfur at 6.65, one CH-proton at 4.22τ, and 9 aromatic protons at 2.3–3.2τ.

---

[2] The solution of diethylaminoethyl chloride was prepared as follows: To a stirred suspension of 35 g. of crude diethylaminoethyl chloride hydrochloride in 100 ml. of chlorobenzene at −5° was added a solution of 9 g. of sodium hydroxide in 20 ml. of water. Stirring was continued for 30 minutes at 0°. The organic solution which contained diethylaminoethyl chloride was decanted from the slurry and dried over sodium sulfate for 6 hrs. An aliquot containing 0.1 mole thereof was taken for use above.

EXAMPLE 33

To a solution of 31 g. of 7-chloro-2,3,4,5-tetrahydro-5-phenyl-1,4-benzothiazepine hydrochloride in 120 ml. of alcohol, there was added 100 ml. of 3 N sodium hydroxide. The liberated base was extracted with ether. The ether solution was dried and concentrated in vacuo. To the oily residue, 75 ml. of chlorobenzene and a solution of 45 g. of diethylaminoethyl chloride (prepared from 60 g. of the hydrochloride as in Example 32) in 100 ml. of chlorobenzene was added. The mixture was stirred, refluxed for 20 hrs. and cooled. Crude 7-chloro-4-(2-diethylaminoethyl) - 2,3,4,5-tetrahydro-5-phenyl-1,4-benzothiazepine hydrochloride precipitated, was filtered off and purified by recrystallization from acetone. It formed colorless needles melting at 195–196°.

EXAMPLE 34

To 60 ml. of concentrated sulfuric acid, cooled to 10°, 6.9 g. (0.1 mole) of sodium nitrite was added slowly with stirring. The mixture was then heated to about 80° until a clear solution formed. After cooling to 45°, 26.5 g. (0.1 mole) of 2-amino-5-trifluoromethylbenzophenone was added in portions keeping the temperature between 45–50°. After stiring for 1 hr., the solution was poured slowly into 400 ml. of ice water. After filtration, a solution of 20 g. of sodium fluoroborate in 80 ml. of water was added to the filtrate. 2-benzoyl-4-trifluoromethylbenzene diazonium fluoroborate precipitated. It was separated by filtration and then washed with a small amount of water. The so-washed precipitate was added over a period of 5 minutes to a vigorously stirred solution of 24 g. (0.15 mole) of recrystallized potassium ethyl xanthate[3] in 200 ml. of water heated to 70°. After the addition was completed, the mixture was stirred for 5 min., cooled and extracted with ether. The ether extract was dried over sodium sulfate filtered and the filtrate concentrated in vacuo to dryness. The oily crude residue containing ethyl xanthic acid 2-benzoyl-4-trifluoromethylphenyl ester was obtained. A solution of 20 g. of potassium hydroxide in a mixture of 60 ml. of water and 60 ml. of ethanol was added to the oily crude residue. The reaction mixture was then stirred and refluxed for 10 min., while 3.5 g. of zinc dust was carefully introduced. 150 ml. of water was then added, and the mixture was filtered over a filter aid, and washed with 50 ml. of water. The filtrate containing 2-mercapto-5-trifluoromethylbenzophenone was cooled to room temperature, and a solution of 20 g. of bromoethylamine hydrobromide in 35 ml. of water was added. After stirring for 30 min., the reaction mixture was extracted with methylene chloride and the organic layer dried over sodium sulfate and filtered. The filtrate was acidified with methanolic hydrochloric acid and concentrated in vacuo. To the residue, consisting of 2-(2 - aminoethylthio) - 5 - trifluoromethylbenzophenone and 2,3-dihydro-5-phenyl - 7 - trifluoromethyl-1,4-benzothiazepine, 100 ml. of pyridine was added. The solution was refluxed for 2 hrs. and then concentrated in vacuo. The residue was then dissolved in a mixture of ether and water. The organic layer was separated, dried and concentrated in vacuo to dryness. The residue was dissolved in an excess of methanolic hydrogen chloride and concentrated in vacuo to dryness. The so-obtained residue was crystallized from a mixture of methylene chloride, ether and petroleum ether yielding crude 2,3-dihydro-5-phenyl-7-trifluoromethyl - 1,4-benzothiazepine hydrochloride. The product was recrystallized from isopropanol and gave yellow prisms of the product melting at 231–232°. The base, namely, 2,3-dihydro-5-phenyl-7-trifluoromethyl-1,4-benzothiazepine, was liberated from the hydrochloride in an ice cold mixture of ether and dilute sodium hydroxide. The organic layer was dried and concentrated in vacuo to dryness. The residue was recrystallized from petroleum ether and gave colorless prisms of the free base melting at 90–91°.

EXAMPLE 35

To a solution of 2.2 g. of 2-mercaptoethylamine hydrochloride in 125 ml. of pyridine was added 1 g. of 53% sodium hydride in 5.6 g. of 2-chloro-5-trifluoromethylbenzophenone. The reaction mixture was heated on the steam bath for 3 hrs. and then concentrated in vacuo to dryness. Cold dilute hydrochloric acid and ether was added to the residue and 5-trifluoromethyl-2-(2-aminoethylthio)-benzophenone hydrochloride which precipitated was separated by filtration. Recrystallization of the product from isopropanol gave colorless needles melting at 178–179°.

This product could be cyclized to 2,3-dihydro-5-phenyl-7-trifluoromethyl-1,4-benzothiazepine hydrochloride by treatment with boiling pyridine.

EXAMPLE 36

7.5 g. of 6'-amino-3',4'-dimethoxyacetophenone was added to 70 ml. of dilute hydrochloric acid (1:1). The resultant mixture was heated at 50° until complete solution, then placed in an ice-bath, and stirred until the inside temperature had dropped below +5°. To the fine suspension, thus obtained, there was added dropwise a solution of 2.9 g. of sodium nitrite in 5 ml. of water at such a rate as to maintain the temperature at 0° to +5°. After the addition was completed, the mixture was stirred in the ice-bath for 1½ hours. A filtered solution of 7.7 g. of sodium fluoroborate in 30 ml. of water was added and the mixture stirred for 30 minutes. 2-acetyl-4,5-dimethoxy benzene diazonium fluoroborate which precipitated was collected by filtration and washed with water.

8.5 grams of the precipitated diazonium fluoroborate while still damp, was added in small portions to a solution of 8 g. of potassium ethyl xanthate in 50 ml. of water. During the addition, the temperature was maintained at 70–75°. After the addition was completed, heating was continued for 15 minutes. The cooled mixture was extracted with ether. The ether extract was washed with 5% sodium hydroxide solution, then with water, and dried over sodium sulfate. The oily residue, obtained after removal of the solvent, was taken up in a small amount of ether. The ethylxanthic acid-2-acetyl-4,5-dimethoxyphenyl ester of M.P. 92–93° precipitated and was isolated by filtration. Recrystallization from dilute ethanol raised the M.P. of the product to 94–95°.

EXAMPLE 37

7.5 g. of 6'-amino-3',4'-dimethoxyacetophenone was dissolved in 70 ml. of dilute hydrochloric acid (1:8) at 40°. To the cooled solution was added dropwise a solution of 2.9 g. of sodium nitrite in 10 ml. of water while maintaining the temperature of the reaction mixture at 0° to +5°. After the addition was completed, the so-formed diazonium solution was stirred for 1 hour in the cooling bath and was then added in small portions to a solution of 8 g. of potassium ethyl xanthate in 10 ml. of water. During the addition, the temperature was maintained at 70–75°. After about three quarters of the diazonium chloride solution has been added, 1 g. of sodium carbonate was added to the xanthate solution to keep the reaction mixture alkaline. After the addition was completed, the mixture was heated for 30 minutes, cooled and extracted with ether. The ether extract was washed with 5% sodium hydroxide solution, then with water, and dried over sodium sulfate. After removal of the solvent, the viscous residue was dissolved in a minimum of ether. Crystals of ethylxanthic acid-2-acetyl-4,5-dimethoxyphenyl ester which appeared, were isolated by filtration and were found to have a melting point of 91–93°.

EXAMPLE 38

To a solution of 37.5 g. of copper sulfate in 150 ml. of water (90°) there was added a solution of 34.5 g.

---

[3] Technical grade ethyl xanthate was recrystallized from a fine-fold amount of boiling ethanol.

cipitated copper thiocyanate in 75 ml. of water. The precipitated copper thiocyanate was filtered off, washed with water, and suspended in 150 ml. of water containing 90 g. of potassium thiocyanate. To the stirred suspension, there was added dropwise the diazonium chloride solution prepared from 30 g. of 6'-amino-3',4'-dimethoxyacetophenone as in Example 37. During the addition the temperature of the reaction mixture was maintained at 70-75°. After the addition was completed, the mixture was stirred and heated for 15 minutes. The precipitate which formed was filtered off, washed with water and dried in vacuo at 50°. The dried solids were extracted three times with 200 ml. of ethanol. The combined extracts, on cooling, deposited 3,4-dimethoxy-6-thiocyanatoacetophenone in crystalline form. After recrystallization from acetonitrile-water, the 3,4-dimethoxy-6-thiocyanatoacetophenone melted at 144-146°.

EXAMPLE 39

3,4-dimethoxy-6-thiocyanatoacetophenone was prepared as in Example 38, but instead of using the diazonium chloride solution, the corresponding fluoroborate salt was used in the reaction. It was added to the copper thiocyanate suspension at 70 to 75° and the reaction was worked up as described in Example 38. 60 g. of 6'-amino-3',4'-dimethoxyacetophenone was employed as the starting material.

EXAMPLE 40

To a suspension of 18 g. of 3,4-dimethoxy-6-thiocyanatoacetophenone and 14 g. of sodium hydrosulfite in 220 ml. of ethanol, there was added 54 ml. of 40% sodium hydroxide solution. The resultant mixture was refluxed for 30 minutes in a nitrogen atmosphere. To the cooled mixture, there was added a solution of 20 g. of 2-bromoethylamine hydrobromide in 40 ml. of water. The mixture was stirred at room temperature for one hour and then heated on the steam bath for an additional hour. The mixture was then filtered. The filtrate was diluted with 1 liter of water and extracted with methylene chloride. The extract was dried over sodium sulfate, filtered, acidified with ethanolic hydrochloric acid, and evaporated to dryness in vacuo. The residue was dissolved in hot ethanol, filtered and cooled. Addition of excess ether precipitated 2,3-dihydro-7,8-dimethoxy-5-methyl-1,4-benzothiazepine hydrochloride in the form of yellow crystals. After recrystallization from ethanol-ether, the compound was found to have a melting point of 201-203° (dec.).

The free base was obtained by dissolving the 2,3-dihydro-7,8-dimethoxy-5-methyl-1,4-benzothiazepine hydrochloride in water, making the solution alkaline, and extracting with ether. The dried ether extract was evaporated to dryness, and the residue recrystallized from heptane giving the base of melting point 101-103°.

EXAMPLE 41

7 g. of ethtylxanthic acid 2-acetyl-4,5-dimethoxyphenyl ester was dissolved in 20 ml. of 30% ethanolic potassium hydroxide and refluxed for 1 hour, under nitrogen. To the cooled solution, there was added 6.2 g. of 2-bromoethylamine hydrobromide. The resultant mixture was stirred for 1 hour at room temperature, filtered and taken to dryness. To the residue was added chloroform and water. The chloroform layer was separated, dried and evaporated to dryness. The residue was dissolved in 25 ml. of pyridine and refluxed for 2 hours, after which time the resultant solution was evaporated to dryness. The residue was taken up in water and chloroform and then the organic layer was separated, dried and taken to dryness. The residue was dissolved in a minimum of ethanol and acidified with hydrochloric acid. 2,3-dihydro-7,8-dimethoxy-5 - methyl-1,4-benzothiazepine hydrochloride which precipitated was separated by filtration. After recrystallization from ethanol-ether, the compound was found to have a melting point of 200-201° (dec.).

EXAMPLE 42

1 g. of 2,3-dihydro-7,8-dimethoxy-5-methyl-1,4-benzothiazepine hydrochloride was refluxed in 20 ml. of 3 N hydrochloric acid for 18 hours. The hot solution was treated with charcoal, filtered and chilled. 6'-(2-aminoethylmercapto) - 3',4' - dimethoxyacetophenone hydrochloride precipitated as crystals and was isolated by filtration. Upon recrystallization from ethanol, the product was found to have a melting point of 177-178°.

EXAMPLE 43

11.8 g. of 2,3-dihydro-7,8-dimethoxy-5-methyl-1,4-benzothiazepine hydrochloride was dissolved in 200 ml. of water. 44 ml. of 1 N sodium hydroxide was added and the mixture homogenized by the addition of 100 ml. of ethanol. To the alkaline solution, there was added a solution of 9.5 g. of sodium borohydride in 75 ml. of water. The resultant mixture was allowed to stand at room temperature for 18 hours. The solution was acidified, diluted with 500 ml. of water, made alkaline again and extracted with methylene chloride. The extract was washed with water, dried over magnesium sulfate and filtered. The filtrate was acidified with hydrochloric acid and evaporated to dryness. 7,8-dimethoxy-5-methyl-2,3,4,5-tetrahydro-1,4-benzothiazepine hydrochloride was obtained as a white solid which melted at 259-261°. Recrystallization from ethanol-ether raised the melting point to 261-263°.

The free base was prepared by dissolving the last-mentioned hydrochloride in water, making the solution alkaline and extracting with ether. The dried ether extract was evaporated to dryness and the residue was recrystallized from methanol-water giving 7,8-dimethoxy-5-methyl-2,3,4,5-tetrahydro-1,4-benzothiazepine as white crystals, M.P. 57-59°.

EXAMPLE 44

2.7 g. of 7,8-dimethoxy-5-methyl-2,3,4,5-tetrahydro-1,4-benzothiazepine hydrochloride was dissolved in 25 ml. of glacial acetic acid. 4.4 g. of 30% hydrogen peroxide was added, and the mixture allowed to stand at room temperature for 2 weeks. After removal of the solvent, the residue was treated with hot methylene chloride and the solids isolated by filtration. After recrystallization from methanol-ether, 7,8-dimethoxy-5-methyl-2,3,4,5-tetrahydro-1,4-benzothiazepine 1,1-dioxide hydrochloride was obtained of M.P. 252-254° (dec.).

The free base was prepared by dissolving the last-mentioned hydrochloride in water, making the solution alkaline and extracting with ether. The dried ether extract was evaporated to dryness and the residue was added to benzene and crystallized from ½ mole of benzene, yielding crystals of melting point 151-153°.

After drying for 24 hours in vacuo at 110°, 7,8-dimethoxy-5-methyl-2,3,4,5-tetrahydro - 1,4 - benzothiazepine 1,1-dioxide was obtained in pure form, M.P. 151-153°.

EXAMPLE 45

To a solution of 10 g. of copper sulfate in 50 ml. of water (90°), there was added a solution of 5 g. of potassium thiocyanate in 20 ml. of water. The precipitated copper thiocyanate was filtered off, washed with water and suspended in 100 ml. of water containing 25 g. of potassium thiocyanate. 12.6 g. of 6-amino-3,4-dimethoxyphenyl phenethyl ketone was suspended in 300 ml. of 1 N hydrochloric acid and the suspension heated on the steam bath for 15 minutes. After cooling, a solution of 3.5 g. of sodium nitrite in 20 ml. of water was added dropwise with stirring at a temperature of 0° to +5°. Upon completion of such addition, the suspension was stirred in a cooling bath for 1 hour and yielded 4,5-dimethoxy-2-(3-phenylpropionyl)-benzene diazonium chloride. This suspension was carefully added to the copper thiocyanate suspension while maintaining the temperature of the reaction mixture at 70–75° during such addition. After the addition was completed, the mixture was stirred and heated for 20 minutes. The precipitate which formed was filtered off, washed with water and dried in vacuo at 50°. The dried solids were extracted repeatedly with acetonitrile. The combined extracts, on chilling, deposited crystals of 3,4-dimethoxy-6-thiocyanatophenyl phenethyl ketone. After recrystallization from acetonitrile-water, the product melted at 145–146°.

EXAMPLE 46

To a solution of 16 g. of copper sulfate in 65 ml. of water (90°) there was added a solution of 14.5 g. of potassium thiocyanate in 35 ml. of water. Copper thiocyanate precipitated. The precipitate was filtered off, washed with water and suspended in 65 ml. of water containing 25 g. of potassium thiocyanate. To the stirred suspension, there was added dropwise a 4-bromo-2-(2-picolynoyl)benzene diazonium chloride solution prepared by dissolving 14 g. of 6-amino-3-bromophenyl 2-pyridyl ketone in 130 ml. of dilute hydrochloric acid (1:8), cooling the so-formed solution, adding the same dropwise to a solution of 4 g. of sodium nitrite in 15 ml. of water at a temperature range of 0°–+5° and after completion of such addition, stirring for 1 hour in the cooling bath. During the addition of the diazonium chloride solution to the stirred suspension, the temperature of the reaction mixture was maintained at 70–75°. After the addition was complete, 8 g. of sodium bicarbonate was added and the mixture cooled. The precipitate which formed was filtered off, washed with water and dried in vacuo at 50°. The dried solids were extracted repeatedly with hot ethanol. The combined extracts on cooling yielded crystals of 3-bromo-6-thiocyanatophenyl 2-pyridyl ketone. After recrystallization from ethanol, the last-mentioned product melted at 159–161°.

EXAMPLE 47

To a suspension of 6.3 g. of 3-bromo-6-thiocyanatophenyl 2-pyridyl ketone and 3.5 g. of sodium hydrosulfite in 60 ml. of ethanol, there was added 15 ml. of 40% sodium hydroxide solution. The resultant mixture refluxed for 30 minutes under nitrogen. To the cooled mixture was added a solution of 4.4 g. of 2-bromoethylamine hydrobromide in 10 ml. of water. The mixture was stirred for one hour at room temperature and heated for one hour on the steam bath. The mixture was diluted with 200 ml. of water and extracted with methylene chloride. The extract was treated with charcoal, acidified with ethanolic hydrochloric acid, and taken to dryness. To the residue there was added a minimum of ethanol. Crystals of 7 - bromo-2,3-dihydro-5-(2-pyridyl)-1,4-benzothiazepine hydrochloride which formed were filtered off. The mother liquors, on standing for 24 hours, yielded additional crystals of the last-mentioned product. The crystals were combined, and recrystallized from ethanol-ether to give yellow crystals of the product melting at 205–210° (dec.).

EXAMPLE 48

To a suspension of 2.1 g. of 3-bromo-6-thiocyanatophenyl-2-pyridyl ketone and 1.1 g. of sodium hydrosulfite in 20 ml. of ethanol, there was added 5 ml. of 40% sodium hydroxide solution. The mixture was heated for 30 minutes under nitrogen. To the cooled mixture, there was added a solution of 1.5 g. of 2-bromoethylamine hydrobromide in 3 ml. of water. After stirring for one hour at room temperature, 75 ml. of water was added. The mixture was extracted with methylene chloride. The extract was treated with charcoal, dried over magnesium sulfate, and concentrated in vacuo to a small volume. Addition of a small amount of ethanol induced crystallization, 7-bromo - 2,3-dihydro-5-(2-pyridyl)-1,4-benzothiazepine in the form of crystals was isolated by filtration. From the mother liquors an additional amount of the product in crystalline form was obtained. The crystals were combined and after recrystallization from isopropanol, the product melted at 166–168°.

EXAMPLE 49

To a solution of 2.4 g. of 7,8-dimethoxy-5-methyl-2,3,4,5-tetrahydro-1,4-benzothiazepine in 35 ml. of chlorobenzene, there was added 3.4 g. of 2-diethylaminoethyl chloride. The resultant mixture was refluxed for 16 hours. The cooled solution was filtered from some insolubles and chilled. Upon chilling, white crystals of 4-(2-diethylaminoethyl) - 7,8-dimethoxy-5-methyl-2,3,4,5-tetrahydro-1,4-benzothiazepine hydrochloride were isolated by filtration. Upon recrystallization from ethanol-ether, the product was found to have a melting point of 172–174°.

EXAMPLE 50

A solution of 12.2 g. (0.04 mole) of 2,3-dihydro-7-trifluoromethyl-5-phenyl-1,4-benzothiazepine in 200 ml. of dry tetrahydrofuran was added slowly at room temperature to a stirred suspension of 3.0 g. (0.08 mole) of lithium aluminum hydride in 200 ml. of tetrahydrofuran. The reaction mixture was refluxed for 2 hr. and then cooled in an ice bath. One liter of wet ether was added slowly and then the mixture was filtered through a hyflo-bed. The filtrate was dried and concentrated in vacuo to dryness. The residue was dissolved in isopropanol and acidified with a solution of hydrogen chloride in isopropanol. On standing, crystalline 2,3,4,5-tetrahydro-7-trifluoromethyl-5-phenyl-1,4-benzothiazepine hydrochloride was obtained. Recrystallization of the product from isopropanol gave colorless prisms melting at 255–257°.

EXAMPLE 51

An ampul containing 7-chloro-2,3-dihydro-5-phenyl-1,4-benzothiazepine hydrochloride suitable for parenteral use is prepared as follows:

100 mg. of a parenteral grade of 7-chloro-2,3-dihydro-5-phenyl-1,4-benzothiazepine hydrochloride, fiber free, is filled into a 5 cc. ampul using a Diehl Mater electric filler. The ampuls are sealed and sterilized at 255° F. for 2 hours.

Immediately before use, the powder is solubilized with 5 cc. of water for injection, U.S.P. and is thus placed in a form suitable for parenteral use.

EXAMPLE 52

A tablet dosage form containing 7-chloro-2,3-dihydro-5-phenyl-1,4-benzothiazepine hydrochloride as the active component was prepared. It had the following composition:

| Ingredient: | Per tablet, mg. |
|---|---|
| 7-chloro-2,3-dihydro - 5 - phenyl-1,4-benzothiazepine hydrochloride | 5.0 |
| Lactose | 113.5 |
| Corn starch | 70.5 |
| Pregelatinized corn starch | 8.0 |
| Calcium stearate | 3.0 |
| Total weight | 200.0 |

The procedure for preparing the tablet dosage form is as follows:

In a suitable size mixer, mix the active component, lactose, corn starch and pregelatinized corn starch. Pass the mix through a Fitzpatrick Comminuting Machine fitted with #1A screen and with knives forward. Return to the said mixer and moisten with water to a thick paste. Pass the moist mass through a #12 screen and dry the moist granules on paper lined trays at 110° F. Return the dried granules to the mixer, add the calcium stearate and mix well. Compress the granules at a tablet weight of 200 mg., using standard concave punches having a diameter of 5/16″.

EXAMPLE 53

A capsule dosage formulation containing 7-chloro-2,3-dihydro-5-phenyl-1,4-benzothiazepine hydrochloride as the active component was prepared. It had the following composition:

| Ingredient: | Per capsule, mg. |
|---|---|
| 7-chloro-2,3-dihydro-5-phenyl-1,4-benzothiazepine hydrochloride | 10 |
| Lactose | 158 |
| Corn starch | 37 |
| Talc | 5 |
| Total weight | 210 |

The procedure for preparing the capsule dosage formulation was as follows:

Mix the active component with lactose and corn starch in a suitable mixer. Further blend the mixture by passing it through a Fitzpatrick Comminuting Machine with a No. 1A screen and with knives forward. Return the blended powder to the mixer, add the talc and blend thoroughly. Fill into No. 4 hard shell gelatin capsules on a Parke Davis or similar type capsulating machine.

EXAMPLE 54

A suppository dosage formulation containing 7-chloro-2,3-dihydro-5-phenyl-1,4-benzothiazepine hydrochloride as the active ingredient was prepared. It had the following composition:

| Ingredient: | Per 1.3 gm. suppository, gm. |
|---|---|
| 7-chloro-2,3-dihydro-5-phenyl-1,4-benzothiazepine hydrochloride | 0.010 |
| Wecobee M* | 1.245 |
| Carnauba wax | 0.045 |

*A synthetic cocoa butter base.

The procedure for preparing the suppository dosage formulation was as follows:

Melt the Wecobee M and the carnauba wax in a suitable size glass lined or stainles steel container, mix well and cool the mixture to 45° C. Add the drug which has been reduced to a fine powder with no lumps and stir until completely and uniformly dispersed. Pour the mixture into suppository molds suitable for providing suppositories having an individual weight of 1.3 gms. Cool and remove from molds.

What is claimed is:

1. A compound selected from the group consisting of compounds of the formula

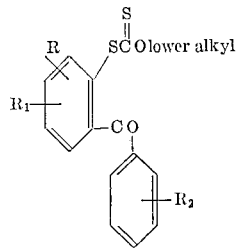

wherein R and $R_1$ are selected from the group consisting of hydrogen, halogen, lower alkoxy, nitro, lower alkyl and trifluoromethyl and $R_2$ is selected from the group consisting of hydrogen, lower alkyl and halogen.

2. A compound as defined in claim 1 of the formula lower alkyl xanthic acid 2-benzoyl-4-halophenyl ester.

3. A compound as defined in claim 2 of the formula lower alkyl xanthic acid 2-benzoyl-4-chlorophenyl ester.

4. A compound as defined in claim 3 of the formula ethyl xanthic acid 2-benzoyl-4-chlorophenyl ester.

5. A compound as defined in claim 1 of the formula lower alkyl xanthic acid 2-benzoyl-phenyl ester.

6. A compound as defined in claim 1 of the formula lower alkyl xanthic acid 2-benzoyl-4-trifluoromethyl phenyl ester.

7. A compound as defined in claim 6 of the formula ethyl xanthic acid 2-benzoyl-4-trifluoromethyl phenyl ester.

8. A compound as in claim 1 wherein at least one of R, $R_1$ or $R_2$ is other than hydrogen.

9. A compound selected from the group consisting of compounds of the formula

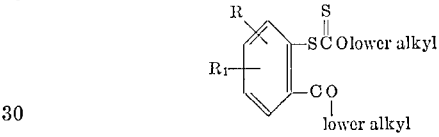

wherein R and $R_1$ are selected from the group consisting of hydrogen, halogen, lower alkoxy, nitro, lower alkyl and trifluoromethyl; at least one of R and $R_1$ being other than hydrogen.

10. A compound as defined in claim 9 of the formula lower alkyl xanthic acid - 2 - acetyl - 4,5 - dilower alkoxy phenyl ester.

References Cited

UNITED STATES PATENTS

| 2,721,214 | 10/1955 | Troutman | 260—455 |
| 2,861,913 | 11/1958 | Wegler et al. | 260—455 |
| 2,923,727 | 2/1960 | Neumoyer | 260—455 |
| 3,338,947 | 8/1967 | Berezin et al. | 260—455 |
| 3,367,857 | 2/1968 | Falbe et al. | 424—331 |

OTHER REFERENCES

Zhuravlev (I and II), "Triphenylmethyl and phenacyl esters of xanthic acids," (1950), CA 46, pp. 10107–08 (1952).

LEWIS GOTTS, Primary Examiner

G. HOLLRAH, Assistant Examiner

U.S. Cl. X.R.

260—326; 424—331